United States Patent [19]

Kinoshita

[11] Patent Number: 4,635,126
[45] Date of Patent: Jan. 6, 1987

[54] IMAGE PICK-UP SYSTEM

[75] Inventor: Takao Kinoshita, Tokyo, Japan

[73] Assignee: Canon Kabushiki Kaisha, Tokyo, Japan

[21] Appl. No.: 815,793

[22] Filed: Jan. 3, 1986

Related U.S. Application Data

[63] Continuation of Ser. No. 770,011, Aug. 28, 1985, which is a continuation of Ser. No. 449,180, Dec. 13, 1982, abandoned.

[30] Foreign Application Priority Data

Dec. 18, 1981 [JP] Japan ............................... 56-205781
Dec. 18, 1981 [JP] Japan ............................... 56-205782

[51] Int. Cl.⁴ ............................................. H04N 5/26
[52] U.S. Cl. .................................. 358/228; 358/213; 354/428
[58] Field of Search ............... 354/428; 358/212, 209, 358/213, 221, 228; 250/578, 204, 201 PF, 211 J, 214 AG

[56] References Cited

U.S. PATENT DOCUMENTS

| | | | |
|---|---|---|---|
| 3,445,590 | 5/1969 | Dischert et al. | 358/228 |
| 3,576,393 | 4/1971 | Thompson | 358/228 |
| 3,651,255 | 3/1972 | Kubota et al. | 358/221 |
| 3,839,669 | 10/1974 | Infante et al. | 358/221 |
| 3,934,161 | 1/1976 | Caywood | 307/311 |
| 3,934,266 | 1/1976 | Shinozaki et al. | 358/44 |
| 4,131,919 | 12/1978 | Lloyd et al. | 360/9 |
| 4,133,008 | 1/1979 | Tisue | 358/282 |
| 4,216,503 | 8/1980 | Wiggins | 358/280 |
| 4,280,141 | 7/1981 | McCann et al. | 358/213 |
| 4,300,167 | 10/1981 | Miller et al. | 358/210 |
| 4,311,904 | 1/1982 | Okada et al. | 250/204 |
| 4,334,150 | 6/1982 | Herbst et al. | 250/201 PF |
| 4,334,151 | 6/1982 | Herbst et al. | 250/201 PF |
| 4,365,272 | 12/1982 | Nagai | 358/228 |
| 4,377,742 | 3/1983 | Kawabata et al. | 250/204 |
| 4,399,464 | 8/1983 | Hix et al. | 358/213 |
| 4,470,067 | 9/1984 | Mino | 358/174 |
| 4,471,228 | 9/1984 | Nishizawa et al. | 250/578 |

FOREIGN PATENT DOCUMENTS

| | | | |
|---|---|---|---|
| 2815342 | 10/1979 | Fed. Rep. of Germany | 358/221 |
| 52-57717 | 5/1977 | Japan | 358/228 |

Primary Examiner—Robert G. Lev
Attorney, Agent, or Firm—Fitzpatrick, Cella, Harper & Scinto

[57] ABSTRACT

An image pick-up system in which the accumulation time of accumulation type image pick-up elements and the gain of an amplifier for amplifying the output of the pick-up elements are controlled through an accumulation time and gain control device on the basis of the brighness of the image light received by the pick-up elements. In a preferred embodiment, the control device has a predetermined accumulation time and gain control program and controls the accumulation time and the gain according to the program.

24 Claims, 4 Drawing Figures

IMAGE PICK-UP SYSTEM

This application is a continuation of application Ser. No. 770,011, filed Aug. 28, 1985, which is a continuation of Ser. No. 449,180, filed Dec. 13, 1982, now abandoned.

BACKGROUND OF THE INVENTION

1. Field of the Invention

This invention relates to an image pick-up system, and more particularly to an image pick-up system which uses, as image pick-up means for converting an optical image into an electrical expression, a signal accumulation type image pick-up or image scanning element known as a CCD, BBD, or MOS image sensor.

2. Description of the Prior Art

Generally, in a signal accumulation type solid state image pick-up element such as a CCD, a dark current is dominant as the noise component for a signal obtained over a long accumulation time. That is, the dark current increases in proportion to the accumulation time of the signal, which leads to the disadvantage that the substantial sensitivity of the element decreases with the accumulation time of the signal.

Heretofore, an attempt has been made to solve that problem by presetting the allowable longest signal accumulation time to a shorter time, but this in turn has given rise to the new inconvenience that the limit of the brightness or luminance of the light that can be picked up is lower than what would be desirable.

Also, when the element is used at a relatively high temperature, the dark current comes into the signal as a non-negligible noise component, which also has led to the disadvantage that the dark current increases as the accumulation time becomes longer.

SUMMARY OF THE INVENTION

The present invention has been made in view of the above-noted situations and an object thereof is to provide a novel image pick-up system which can eliminate the above-noted inconveniences peculiar to the prior art image pick-up system.

Another object of the present invention is to provide a novel image pick-up system which, as an image pick-up system using a signal accumulation type image pick-up element or image scanning element, can provide an image pick-up signal of sufficient level even under low brightness with the signal accumulation time of the element remaining set to a relatively short time, thereby completely eliminating the problem of reduced signal S/N resulting from an increased dark current component which in turn results from the lengthening of the accumulation time.

In this regard, according to a preferred embodiment of the present invention, there is proposed a novel image pick-up system in which the control of the signal accumulation time of said image pick-up element and the control of the gain of a circuit for processing the output of said element are skilfully combined, whereby even at low brightness, an image pick-up signal of sufficient level can be obtained with a relatively short signal accumulation time.

Still another object of the present invention is to provide an image pick-up system which can obtain an image pick-up signal of sufficient level and high S/N even at low brightness while taking the accumulation time dependence of the dark current component into account.

In this regard, according to an embodiment of the present invention, it is proposed to introduce, in the construction of the above-described embodiment, the dark current level information as a parameter into a combination of the control of the signal accumulation time of the element and the control of the circuit gain.

Yet another object of the present invention is to provide an image pick-up system which can obtain an image pick-up signal of sufficient level and high S/N even at low brightness while taking the temperature dependence of the dark current component into account.

In this regard, according to another embodiment of the present invention, it is proposed to introduce, in the construction of the above-described embodiment, the temperature information as a parameter into a combination of the control of the signal accumulation time of the element and the control of the circuit gain.

Other objects and features of the present invention will become apparent from the following detailed description taken in conjunction with the accompanying drawings.

BRIEF DESCRIPTION OF THE DRAWINGS

Preferred embodiments of the present invention will hereinafter be described with reference to the accompanying drawings, in which.

DESCRIPTION OF THE PREFERRED EMBODIMENTS

Figure 1:
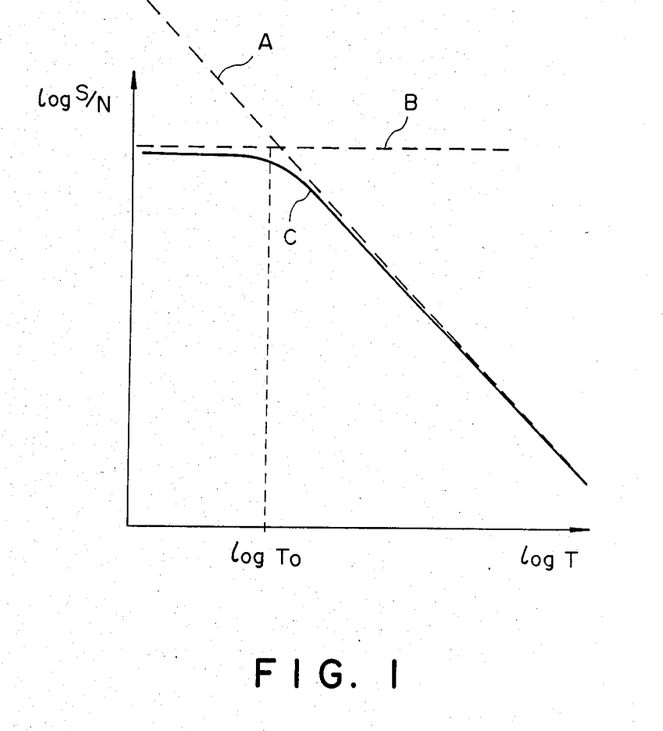
FIG. 1 is a characteristic graph showing the accumulation time dependence of the S/N of the output in a signal accumulation type image pick-up or image scanning element.

Reference is first had to FIG. 1 to describe the accumulation time dependence of the S/N of the output in a signal accumulation type image pick-up element. In FIG. 1, letter A indicates the S/N as a function of the dark current in the element, letter B indicates the S/N as a function of the noise of the amplifier of the output stage, and letter C indicates the S/N as a function of the two. In FIG. 1, both the ordinate and the abscissa are represented on logarithmic scales.

As shown, the noise component due to the dark current comes to impart a great influence on S/N, as compared with the amplifier noise, from the area in which the accumulation time T becomes To, and becomes the main factor which affects the S/N more as the accumulation time becomes longer.

Generally, the sensitivity of an image pick-up element is proportional to S/N and therefore, with such a long accumulation time, the sensitivity is considerably reduced. Accordingly, it is not preferable to use such a long accumulation time.

In the embodiment of the present invention, in view of such point, the domain of the accumulation time used is limited to the short time side, that is, the upper limit of the accumulation time is not set to a very long time and, where an accumulation time exceeding this upper limit is required to obtain an image pick-up signal of sufficient level under conditions of low brightness, the gain of the circuit for dealing with the output of the image pick-up element is increased instead of lengthening the accumulation time, whereby the problems as noted above are solved.

Figure 2:
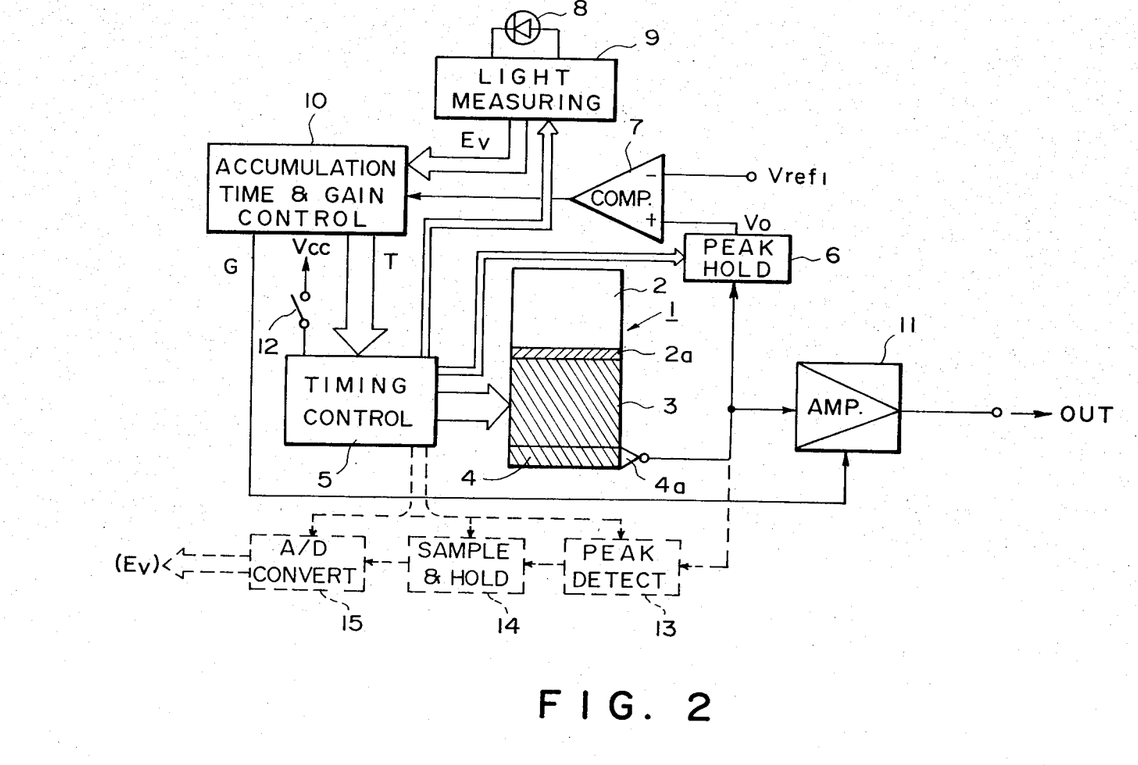
FIG. 2 is a block circuit diagram showing an embodiment of the present invention.

Reference is now had to FIG. 2 to describe an embodiment of the present invention. In FIG. 2, reference numeral 1 designates a signal accumulation type image pick-up element which is, for example, a well-known single phase driven frame transfer type area CCD provided with a photosensitive portion 2 including an arrangement along a number of columns and rows of photosensitive cells sensitive to light to produce charges and accumulating (integrating) the produced charges under a controlled accumulation time, a memory portion 3 including an arrangement along a number of columns and rows of memory cells for introducing and storing the accumulated charges of the photosensitive portion 2, a horizontal transfer register 4 for horizontally transferring the stored charges of the memory portion 3 line by line, and an output amplifier 4a for converting into a voltage the charges transferred by the register 4. In that case, for example, one column of photosensitive cells designated by 2a in the photosensitive portion 2, with the memory portion 3 and the horizontal transfer register 4, is shielded from light by means such as Al evaporation to obtain a dark current component. The image pick-up element 1 is driven by a drive clock from a timing control circuit 5. Designated by 6 is a peak holding circuit which is actuated by the control signal from the timing control circuit 5 to function to hold the peak value of the signal obtained by the produced charges at the light-shielded portion 2a of the photosensitive portion 2, namely, the dark current signal, of the output of the image pick-up element 1, and the timing control circuit 5 imparts to this peak holding circuit 6 control signals for causing the earlier held value of the peak holding circuit 6 to be cleared during a period in which, in the image pick-up element 1, the transfer of charges from the photosensitive portion 2 to the memory portion 4 takes place, and then causing the output of the image pick-up element 1 to be received as the input and causing the peak value thereof to be held during a period in which the produced charges at the light-shielded portion 2a in the photosensitive portion 2 are read out, namely, a clear signal and a hold signal. Denoted by 7 is a comparator which compares the output of the peak holding circuit 6, i.e., the dark current level $V_D$, with a predetermined reference voltage $V_{ref1}$ and produces a high level output when $V_D > V_{ref1}$ and produces a low level output when $V_D \leq V_{ref1}$. Reference numeral 8 designates a light measuring element such as an SPC (silicon photo-cell) provided so as to receive light equal to the light received by the photosensitive portion 2 of the image pick-up element 1 and to produce an output corresponding to the brightness of the received light, and reference numeral 9 denotes a light measuring circuit responsive to the control signal from the timing control circuit 5 to put out brightness information $E_V$ on the basis of the output of the light measuring element 8. The light measuring circuit 9 contains a well-known analog-digital converter circuit therein and is designed to put out the brightness information $E_V$ as digital data. The timing control circuit 5 imparts to the light measuring circuit 9 control signals for causing the output of the light measuring circuit 9 to be sampled and held during a period in which, in the image pick-up element 1, the transfer of charges from the photosensitive portion 2 to the memory portion 3 takes place and for converting into digital brightness information the analog brightness information obtained from the held value and causing the same to be put out, namely, a sampling and holding signal and a reference clock pulse for A/D conversion. Designated by 10 is an accumulation time and gain control circuit for controlling, on the basis of the brightness information $E_V$ from the light measuring circuit 9 and the output of the comparator 7, the gain G of a variable gain amplifying circuit 11 of a well-known construction which amplifies the signal accumulation time T of the image pick-up element 1 and the output of the element 1. The control circuit 10 is designed to control a combination of the accumulation time T and the gain G in accordance with a predetermined program. That is, the control circuit 10 is designed to control a combination of different values of both the accumulation time T and the gain G on the basis of the brightness information $E_V$ in accordance with a program indicated by solid line D in FIG. 3 in which the upper limit accumulation time is $T_U$, for example, when the output of the comparator 7 is low, and in accordance with a program indicated by broken line E in FIG. 3 in which the upper limit accumulation time is $T_L$ ($<T_U$) when the output of the comparator 7 is high. Control circuit 10 comprises a well-known digital circuit such as a ROM or a PLA (programmable logic array). Alternatively, the control circuit 10 may have, for example, a construction like a well-known analog program circuit in a photographic camera wherein a combination of exposure time and aperture value is controlled on the basis of brightness information and film speed information in accordance with a predetermined program. Of course, in this latter case, the light measuring circuit 9 need not have the A/D converting function and is designed to put out the brightness information $E_V$ in the form of an analog signal and the control by the timing control circuit 5 also becomes unnecessary. The means for obtaining the brightness information $E_V$ is not limited to the light measuring circuit 9, but for example, the brightness information $E_V$ array, if desired, be obtained on the basis of the output of the image pick-up element 1. For that purpose, as indicated by broken lines in FIG. 2, provision may be made of a peak detecting circuit 13 for detecting the peak level of the output of the image pick-up element 1, a sampling and holding circuit 14 for sampling and holding the output of the peak detecting circuit 13 and an analog-digital converting circuit 15 for converting the output of the sampling and holding circuit 14 into digital information, and the digital output of the converting circuit 15 may be used as the brightness information $E_V$. In this case, the timing control circuit 5 is designed, for example, to effect (1) for the peak detecting circuit 13, such a control that immediately before the transfer period of charges from the photosensitive portion 2 to the memory portion 3 in the image pick-up element 1 terminates, the value detected to that point is cleared and thereafter, during the time the signal is being read out from the image pick-up element 1, this output is received as the input and the peak level thereof is detected; and (2) for the sampling and holding circuit 14, such a control that immediately after the period of transferring the charges in the image pick-up element 1 starts, the output of the peak detecting circuit 13 is sampled and held; and (3) for the A/D converting circuit 15, such a control that during the transfer period of charges, the analog output of the sampling and holding circuit 14 is converted into digital information. Of course, when the accumulation time and gain control circuit 10 has the construction of an analog program circuit as described above, the A/D converting circuit 15 becomes unnecessary and the output of the sampling and holding circuit 14 can be used as the analog brightness information $E_V$. It is also possible to detect the average level instead of detecting the peak level of the image pick-up output and use it as the brightness information $E_V$.

The timing control circuit 5 is designed, for example, to introduce thereinto a control data (digital data) regarding the accumulation time T from the accumulation time and gain control circuit 10 at a timing immediately after the produced charges at the light-shielded portion 2a in the photosensitive portion 2 of the image pick-up element 1 have been read out through the horizontal transfer register 4, and control, on the basis thereof, the time from that point of time until the transfer of charges from the photosensitive portion 2 to the memory portion 3 is effected in the image pick-up element 1, that is, $T-\Delta t$ if a time $\Delta t$ is required in reading out the produced charges at the light-shielded portion 2a, thereby controlling the signal accumulation time T of the image pick-up element 1.

Designated by 12 is a start switch for giving a start instruction to the timing control circuit 5.

Now, in the above-described construction, when the start instruction is given to the timing control circuit 5 by closing the start switch 12, the timing control circuit 5 imparts a drive clock to the image pick-up element 1, thereby effecting the transfer of the accumulated charges in the photosensitive portion 2 to the memory portion 3. Thereby, production and accumulation of new charges is initiated in the photosensitive portion 2. Also, during this charge transfer period, the timing control circuit 5 imparts a clear signal to the peak holding circuit 6, thereby clearing the so far held value, while, at the same time, it imparts a sampling and holding signal and a reference clock pulse for A/D conversion to the light measuring circuit 9, thereby causing the measured value at that point of time to be held and the digital brightness information $E_V$ A/D-converted therefrom to be put out. After termination of the transfer of charges from the photosensitive portion 2 to the memory portion 3 in the image pick-up element 1, the timing control circuit 5 continuedly imparts the drive clock to the image pick-up element 1 and now causes the charges stored in the memory portion 3 to be read out through the horizontal transfer register 4 and at this time, it imparts a peak hold signal to the peak holding circuit during the time the signal obtained by the produced charges at the light-shielded portion 2a in the photosensitive portion 2, namely, the dark current signal, is put out, thereby causing the peak level $V_D$ thereof to be held. At a point of time whereat the outputting of the signal obtained by the produced charges at this light-shielded portion 2a has terminated, the output of the comparator 7 is settled and thus, at this point of time, the output of the accumulation time and gain control circuit 10 is settled. For example, if it is assumed that the previously settled brightness information $E_V$ from the light measuring circuit 9 (or the A/D converting circuit 15) represented the brightness "$E_{V1}$" (high brightness) indicated in FIG. 3, the control circuit 10 makes the accumulation time T into "T1" independently of the high or low level of the output of the comparator 7, and sets the gain G of the amplifying circuit 11 at "2". However, if it is assumed that the brightness information $E_V$ at this time represented the brightness "$E_{V2}$" (relatively low brightness) indicated in FIG. 3, the control circuit 10 sets the gain G at "32" while, on the other hand, it makes the accumulation time T into the longer upper limit time "$T_U$" if the output of the comparator 7 is low (that is, $V_D \leq V_{refl}$), and makes the accumulation time into the shorter upper limit time "$T_L$" if the output of the comparator 7 is high (that is, $V_D > V_{refl}$).

The timing control circuit 5 introduces thereinto the control data regarding the accumulation time T from the control circuit 10 at a point of time whereat the read-out of the produced charges at the light-shielded portion 2a of the image pick-up element 1 has terminated, i.e., a point of time whereat the output of the accumulation time and gain control circuit 10 has been settled, and controls the signal accumulation time at the light-shielded portion 2a of the image pick-up element 1 on the basis of said control data. That is, in the image pick-up element 1, in subsequence to the read-out of the produced charges at the light-shielded portion 2a, read-out of the produced charges at the portion of the photosensitive portion 2 which is not shielded from light is effected, whereby outputting of an image pick-up signal corresponding to one picture plane is effected, and the timing control circuit 5 starts time count from the point of time whereat the read-out of the produced charges at the light-shielded portion 2a has terminated, and causes the charges so far accumulated in the photosensitive portion 2 to be transferred to the memory portion 3 at a point of time whereat said time $T-\Delta t$ has elapsed, thereby effecting the control of the signal accumulation time in the photosensitive portion 2.

Assuming that a time t is required to read out all the charges transferred from the photosensitive portion 2 to the memory portion 3 in the image pick-up element 1 and stored in the memory portion 3, it should be noted that the lower limit of the accumulation time T, i.e., the shortest accumulation time $T_{min}$ controlled, must not be made shorter than t. Also, where such an image pick-up system is applied to a video camera (movie type) or a television camera, it should also be noted that the upper limit of the accumulation time T, i.e., the longest accumulation time $T_{max} = T_U$ controlled, must not exceed the television field period (for example, in the case of NTSC system, 1/60 sec.).

Of course, the image pick-up system of the present invention is never restricted to the application to a video camera (movie and still) or a television camera, but may be widely applied, for example, to a pattern or image identifying apparatus, an image reading apparatus, or a focus detecting or distance detecting apparatus. The image pick-up element is not restricted to the CCD, but a BBD or MOS image sensor or the like may of course be used and further, as for the type, the area type, the frame transfer type, the interline type or the linear (line) type is widely usable.

Figure 4:
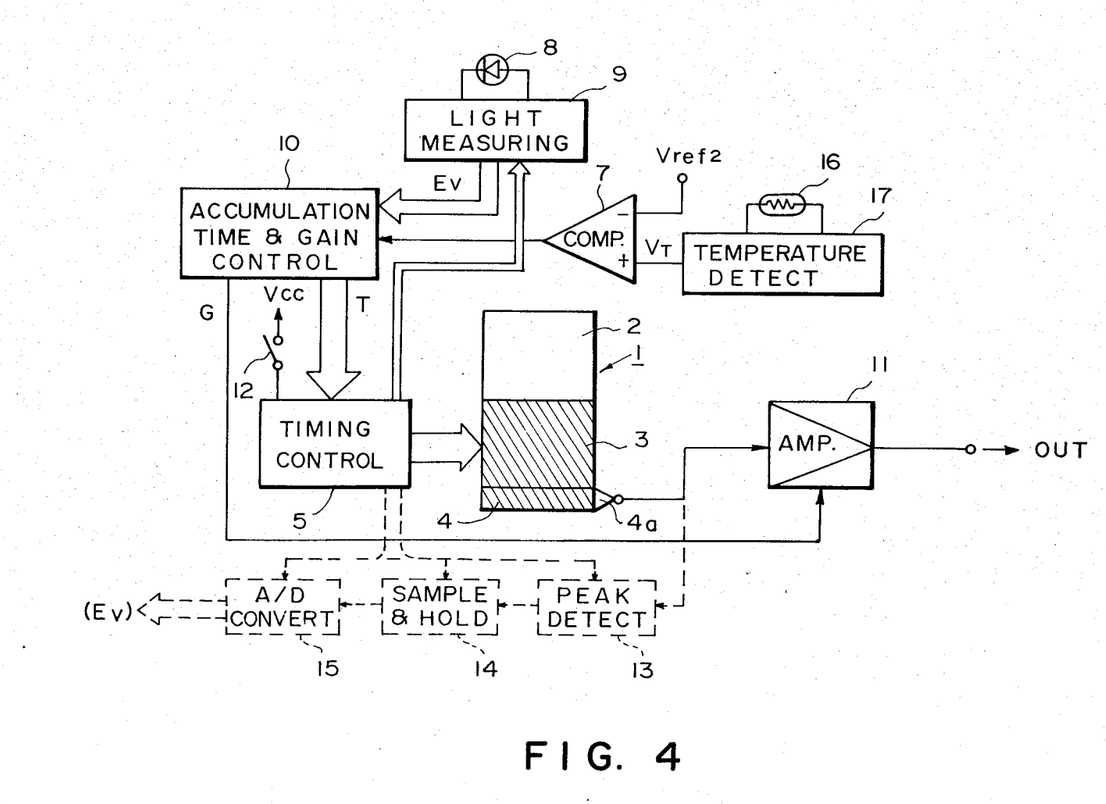
FIG. 4 is a block circuit diagram showing another embodiment of the present invention.

Reference is now had to FIG. 4 to describe another embodiment of the present invention.

In FIG. 4, elements designated by the same reference numerals as those in FIG. 2 are entirely similar in construction and function to those already described with the exception of the following points. In the present embodiment, it is not necessary to provide the light-shielded portion 2a in the photosensitive portion 2 of the image pick-up element 1. Also, as regards the timing control circuit 5, the function of putting out a control signal to the peak holding circuit 6 as shown in FIG. 2 is unnecessary, and the design is somewhat changed such that the timing for introducing the accumulation time data from the accumulation time and gain control circuit 10 is after the output of the light measuring circuit 9 (or the A/D converting circuit 15) has been settled within the transfer period of charges from the photosensitive portion 2 to the memory portion 3 in the image pick-up element 1 and along therewith, from the point of time whereat the accumulation time data has been introduced, the accumulation time T represented by said data is counted to effect the control of the accumulation time in the photosensitive portion 2, i.e., the determination of the point of time whereat charges are to be transferred from the photosensitive portion 2 to the memory portion 3.

In FIG. 4, reference numeral 16 designates a temperature sensing element such as a thermistor preferably provided so as to respond to the ambient temperature in the vicinity of the image pick-up element 1, and reference numeral 17 denotes a temperature detecting circuit for detecting the ambient temperature in the vicinity of the image pick-up element 1 on the basis of the output of the temperature sensing element 16 and putting out temperature information (voltage) $V_T$. The output $V_T$ of the temperature detecting circuit 17, instead of the output $V_D$ of the peak holding circuit 6 of FIG. 2, is imparted to the non-inverting input of the comparator 7. A reference voltage $V_{ref2}$, instead of the reference voltage $V_{ref1}$, is imparted to the inventing input of the comparator 7.

In the other points, the construction of the embodiment of FIG. 4 is entirely similar to the construction shown in FIG. 2.

That is, in the previous embodiment shown in FIG. 2, design has been made such that the changeover of the programs (D and E of FIG. 3) in the accumulation time and gain control circuit 10 is effected in accordance with the dark current level of the output of the image pick-up element 1, whereas in the present embodiment, said change-over is effected in accordance with the ambient temperature in the vicinity of the image pick-up element 1. Thus, according to the construction of FIG. 4, when $V_T \leq V_{ref2}$, that is, when the ambient temperature is not so high, the program indicated by D in FIG. 3 is selected, and when $V_T > V_{ref2}$, that is, when the ambient temperature is relatively high, the program indicated by E in FIG. 3 is selected.

Figure 3:
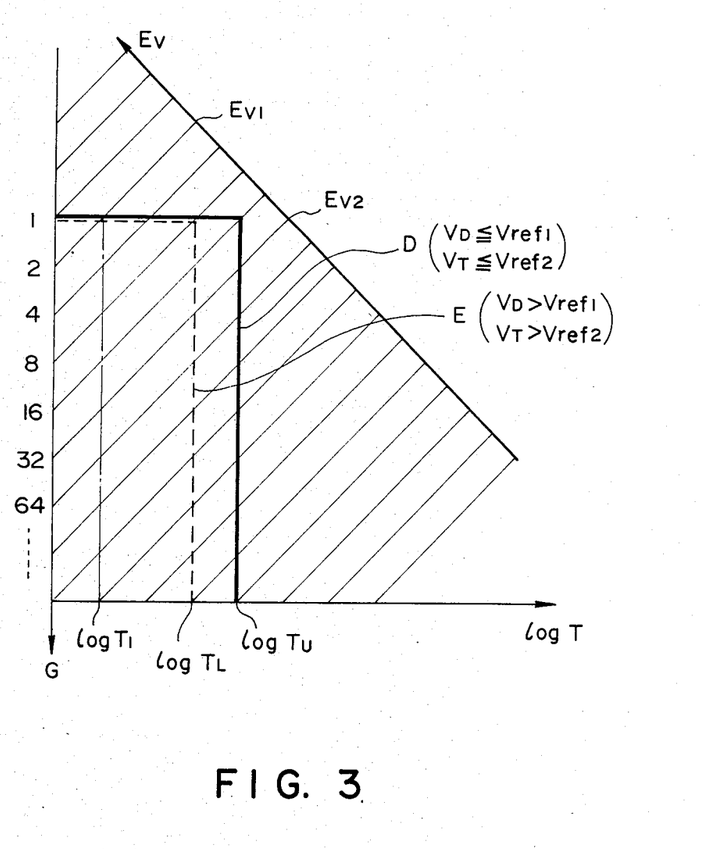
FIG. 3 is a program graph showing an example of the program for the accumulation time-circuit gain control for the brightness set in a control circuit in the image pick-up system shown in FIG. 2.

The control program in the accumulation time and gain control circuit 10 in the present embodiment may be the same as that in the case of the previous embodiment shown in FIG. 3, or may be changed as required.

What I claim is:

1. A radiation sensing system comprising:
   (A) accumulation type radiation sensing means which produces an electrical output corresponding to the accumulation of received radiation over a controlled accumulation time;
   (B) processing means for processing the output of said sensing means, said processing means having a variable gain element;
   (C) intensity detecting means for detecting the intensity of said radiation received by said sensing means, said intensity detecting means producing an electrical output indicative of the detected radiation intensity;
   (D) control means for controlling the accumulation time of said sensing means and said variable gain element in said processing means on the basis of the output of said intensity detecting means;
   dark current detecting means for detecting the level of a dark current generated in said sensing means, said dark current detecting means producing an electrical output indicative of the detected dark current level; and
   limit means for controlling, on the basis of the output of said dark current detecting means, the upper limit of the controllable accumulation time of said control means.

2. A radiation sensing system comprising:
   (A) accumulation type radiation sensing means which produces an electrical output corresponding to the accumulation of received radiation over a controlled accumulation time;
   (B) processing means for processing the output of said sensing means, said processing means having a variable gain element;
   (C) intensity detecting means for detecting the intensity of said radiation received by said sensing means, said intensity detecting means producing an electrical output indicative of the detected radiation intensity;
   (D) control means for controlling the accumulation time of said sensing means and said variable gain element in said processing means on the basis of the output of said intensity detecting means;
   temperature detecting means for detecting the ambient temperature, said temperature detecting means producing an electrical output indicative of the detected ambient temperature; and
   limit means for controlling, on the basis of the output of said temperature detecting means, the upper limit of the controllable accumulation time of said control means.

3. A radiation sensing system comprising:
   (A) accumulation type radiation sensing means which produces an electrical output corresponding to the accumulation of received radiation over a controlled accumulation time;
   (B) processing means for processing the output of said sensing means, said processing means having a variable gain element;
   (C) intensity detecting means for detecting the intensity of said radiation received by said sensing means, said intensity detecting means producing an electrical output indicative of the detected radiation intensity;
   (D) control means for controlling the accumulation time of said sensing means and said variable gain element in said processing means on the basis of the output of said intensity detecting means;
   wherein said control means has a plurality of predetermined accumulation time and gain control programs different in the controllable longest accumulation time and controls the accumulation time and the variable gain element according to selected one of said programs;
   dark current detecting means for detecting the level of a dark current generated in said sensing means, said dark current detecting means producing an electrical output indicative of the detected dark current level; and selection means for selecting one of said programs in said control means on the basis of the output of said dark current detecting means.

4. A radiation sensing system comprising:
(A) accumulation type radiation sensing means which produces an electrical output corresponding to the accumulation of received radiation over a controlled accumulation time;
(B) processing means for processing the output of said sensing means, said processing means having a variable gain element;
(C) intensity detecting means for detecting the intensity of said radiation received by said sensing means, said intensity detecting means producing an electrical output indicative of the detected radiation intensity;
(D) control means for controlling the accumulation time of said sensing means and said variable gain element in said processing means on the basis of the output of said intensity detecting means;
wherein said control means has a plurality of predetermined accumulation time and gain control programs different in the controllable longest accumulation time and controls the accumulation time and the variable gain element according to selected one of said programs;
temperature detecting means for detecting the ambient temperature, said temperature detecting means producing an electrical output indicative of the detected ambient temperature; and
selection means for selecting one of said programs in said control means on the basis of the output of said temperature detecting means.

5. The system according to claim 1 or 2 or 3 or 4, wherein said intensity detecting means includes a radiation responsive element arranged to receive said radiation and producing an electrical signal indicative of the intensity of the received radiation.

6. The system according to claim 1 or 2 or 3 or 4, wherein said intensity detecting means includes a detecting circuit for detecting the level of the output of said sensing means, said circuit producing an electrical signal which indicates the intensity of the radiation received by the sensing means.

7. A radiation sensing system comprising:
(A) accumulation type radiation sensing means which produces an electrical output corresponding to the accumulation of a received radiation over a controlled accumulation time;
(B) intensity detecting means for detecting the intensity of said radiation received by said sensing means, said intensity detecting means producing an electrical output indicative of the detected radiation intensity;
(C) control means for controlling the accumulation time of said sensing means on the basis of the output of said intensity detecting means;
(D) dark current detecting means for detecting the level of a dark current generated in said sensing means, said dark current detecting means producing an electrical output indicative of the detected dark current level; and
(E) limit means for controlling, on the basis of the output of said dark current detecting means, the upper limit of the controllable accumulation time of said control means.

8. The system according to claim 7, wherein said limit means is arranged to limit the controllable longest accumulation time of said control means to a shorter time as the level of the dark current increases.

9. A radiation sensing system comprising:
(A) accumulation type radiation sensing means which produces an electrical output corresponding to the accumulation of a received radiation over a controlled accumulation time;
(B) intensity detecting means for detecting the intensity of said radiation received by said sensing means, said intensity detecting means producing an electrical output indicative of the detected radiation intensity;
(C) control means for controlling the accumulation time of said sensing means on the basis of the output of said intensity detecting means;
(D) temperature detecting means for detecting the ambient temperature, said temperature detecting means producing an electrical output indicative of the detected ambient temperature; and
(E) limit means for controlling, on the basis of the output of said temperature detecting means, the upper limit of the controllable accumulation time of said control means.

10. The system according to claim 9, wherein said limit means is arranged to limit the controllable longest accumulation time of said control means to a shorter time as the ambient temperature becomes high.

11. An image pick-up system comprising:
(a) accumulation type image pick-up means which produces an electrical signal corresponding to the accumulation of received image light;
(b) brightness detecting means for detecting the brightness of an image;
(c) control means for controlling the amount of the electrical signal formed at said image pick-up means in dependence upon the output of said brightness detecting means;
(d) dark current detecting means for detecting the level of a dark current generated at said image pick-up means; and
(e) changing means for changing the control condition of said control means on the basis of the output of said dark current detecting means.

12. An image pick-up system according to claim 11, wherein said brightness detecting means includes light receiving means other than said image pick-up means.

13. An image pick-up system according to claim 11, wherein said brightness detecting means includes means for processing the output of said image pick-up means.

14. An image pick-up system according to claim 11, wherein said control means controls the amount of the electrical signal formed at said image pick-up means by controlling the accumulation period of said image pick-up means.

15. An image pick-up system according to claim 11, further comprising processing means for processing the output of said image pick-up means, wherein said processing means is provided with a variable gain element.

16. An image pick-up system according to claim 15, wherein said control means controls the amount of the electrical signal formed at said image pick-up means by controlling the gain of said processing means.

17. An image pick-up system according to claim 11, wherein said changing means changes the operation limits of said control means in dependence upon the output of said dark current detecting means.

18. An image pick-up system comprising:

(a) accumulation type image pick-up means which produces an electrical signal corresponding to the accumulation of received image light;
(b) brightness detecting means for detecting the brightness of an image;
(c) control means for controlling the amount of the electrical signal formed at said image pick-up means in dependence upon the output of said brightness detecting means;
(d) temperature detecting means for detecting the ambient temperature;
(e) changing means for changing the control condition of said control means on the basis of the output of said temperature detecting means.

19. An image pick-up system according to claim 18 wherein said brightness detecting means includes light receiving means other than said image pick-up means.

20. An image pick-up system according to claim 18, wherein said brightness detecting means includes means for processing the output of said image pick-up means.

21. An image pick-up system according to claim 18, wherein said control means controls the amount of the electrical signal formed at said image pick-up means by controlling the accumulation period of said image pick-up means.

22. An image pick-up system according to claim 18, further comprising processing means for processing the output of said image pick-up means, wherein said processing means is provided with a variable gain element.

23. An image pick-up system according to claim 22, wherein said control means controls the amount of the electrical signal formed at said image pick-up means by controlling the gain of said processing means.

24. An image pick-up system according to claim 18, wherein said changing means change the operation limits of said control means in dependence upon the output of said temperature detecting means.

* * * * *